(12) United States Patent
Muramatsu

(10) Patent No.: US 9,910,608 B2
(45) Date of Patent: Mar. 6, 2018

(54) STORAGE SYSTEM WITH UPDATE FREQUENCY BASED REPLICATION

(71) Applicants: KABUSHIKI KAISHA TOSHIBA, Tokyo (JP); TOSHIBA SOLUTIONS CORPORATION, Kawasaki-shi, Kanagawa (JP)

(72) Inventor: Koji Muramatsu, Tokyo (JP)

(73) Assignees: Kabushiki Kaisha Toshiba, Tokyo (JP); Toshiba Solutions Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 14/900,409

(22) PCT Filed: Feb. 28, 2014

(86) PCT No.: PCT/JP2014/055111
§ 371 (c)(1),
(2) Date: Dec. 21, 2015

(87) PCT Pub. No.: WO2015/129035
PCT Pub. Date: Sep. 3, 2015

(65) Prior Publication Data
US 2016/0357460 A1 Dec. 8, 2016

(51) Int. Cl.
*G06F 12/00* (2006.01)
*G06F 3/06* (2006.01)
(Continued)

(52) U.S. Cl.
CPC .............. *G06F 3/0619* (2013.01); *G06F 3/06* (2013.01); *G06F 3/065* (2013.01); *G06F 3/067* (2013.01);
(Continued)

(58) Field of Classification Search
CPC ........ G06F 3/0619; G06F 3/065; G06F 3/067; G06F 11/2097; G06F 11/2094; G06F 11/1446; G06F 3/06
(Continued)

(56) References Cited

U.S. PATENT DOCUMENTS 6,286,085 B1 9/2001 Jouenne et al.
2001/0052058 A1* 12/2001 Ohran ................. G06F 11/1464
711/161
(Continued)

FOREIGN PATENT DOCUMENTS

| JP | 10-308755 | 11/1996 |
|----|-----------|---------|
| JP | 2006-236019 | 9/2006 |
| JP | 2010-170485 A | 8/2010 |

OTHER PUBLICATIONS

English-language International Search Report issued by the Japanese Patent Office in corresponding International Application No. PCT/JP2014/055111, (2 pages), dated May 20, 2014.

*Primary Examiner* — Tuan Thai
*Assistant Examiner* — Tasnima Matin
(74) *Attorney, Agent, or Firm* — Finnegan, Henderson, Farabow, Garrett & Dunner, L.L.P.

(57) ABSTRACT

A storage system includes a storage unit and a control unit. Data is stored in the storage unit. The control unit performs replication of data that is updated, based on the frequency with which the data is updated. The control unit may include a frequency detection unit, a policy management unit, and a replication performance unit. The frequency detection unit detects the update frequency with which the data is updated, by detecting the number of times that the data is updated. The policy management unit determines a replication policy for the data based on the update frequency with which the data is updated. The replication performance unit performs
(Continued)

replication of the updated data based on the replication policy.

1 Claim, 10 Drawing Sheets

(51) Int. Cl.
*G06F 11/14* (2006.01)
*G06F 11/20* (2006.01)
(52) U.S. Cl.
CPC ...... *G06F 11/1446* (2013.01); *G06F 11/2094* (2013.01); *G06F 11/2097* (2013.01)
(58) Field of Classification Search
USPC ........................................................ 711/162
See application file for complete search history.

(56) References Cited

U.S. PATENT DOCUMENTS

2003/0177122 A1* 9/2003 Makansi ............ G06F 17/30578
2006/0195666 A1* 8/2006 Maruyama ............ G06F 3/0613
711/162

\* cited by examiner

FIG. 2

| ADDRESS | COUNTER VALUE |
|---|---|
| 0 | 2 |
| ⋮ | ⋮ |
| A | 128 |
| ⋮ | ⋮ |
| 2A | 0 |
| ⋮ | ⋮ |
| 3A | 15 |
| ⋮ | ⋮ |

FIG. 3

| ADDRESS | POLICY |
|---|---|
| 0 | TRANSMISSION AT EACH WRITING |
| ⋮ | ⋮ |
| A | TRANSMISSION WITH EACH PERIOD |
| ⋮ | ⋮ |
| 2A | TRANSMISSION AT EACH WRITING |
| ⋮ | ⋮ |
| 3A | TRANSMISSOIN WITH EACH PERIOD |
| ⋮ | ⋮ |

FIG. 4

| PRIMARY SITE ADDRESS | TEMPORARY STORAGE AREA ADDRESS |
|---|---|
| 0 | B1 |
| 3A | B2 |
| A | B3 |
| ⋮ | ⋮ |

FIG. 10

| 2 | 0 | 0 | ............ | 3 |
|---|---|---|---|---|
| 0 | 1 | 3 | ............ | 1 |
| 1 | 0 | 2 | ............ | 0 |
| | | | ⋮ | |
| 1 | 1 | 1 | 1 | 1 | 1 | 1 | 2 |

STORAGE SYSTEM WITH UPDATE FREQUENCY BASED REPLICATION

TECHNICAL FIELD

Embodiments of the present invention relate to a storage system.

BACKGROUND ART

There is a storage system that replicates data which is stored in a primary site to a backup site (for example, refer to PTL 1).

CITATION LIST

Patent Literature

[PTL 1] Japanese Unexamined Patent Application, First Publication No. 2010-170485

SUMMARY OF INVENTION

Issue to be Addressed by the Invention

When performing data replication, the storage system has an issue in that a band for communication over a network is bottlenecked, thereby causing congestion in communication between the primary site and the backup site.

For example, each time data is updated in the primary site, in a case where the replication to the backup site is performed, transmission of a large amount of pieces of data to the backup site occurs with a high frequency according to an update frequency with which the data is updated. Furthermore, for example, in a case where the replication to the backup site is performed all at once at a specific point in time without the replication being immediately performed even though the data is updated in the primary site, the transmission of a large amount of data occurs at a specific point in time according to a total amount of pieces of data that are updated.

An object of the present invention, which is made to address the issue described above, is to provide a storage system that is capable of preventing congestion from occurring in communication (data transmission) between a primary site and a backup site when performing data replication.

Means for Addressing the Issue

A storage system includes a storage unit and a control unit. Data is stored in the storage unit. The control unit performs replication of the updated data based on an update frequency with which the data is updated.

BRIEF DESCRIPTION OF DRAWINGS

FIG. 2 is a diagram illustrating an example of a counter table as one piece of meta data according to the first embodiment.

FIG. 3 is a diagram illustrating an example of a replication policy management table as one piece of meta data according to the first embodiment.

FIG. 4 is a diagram illustrating an example of an address table according to the first embodiment.

FIG. 10 is a diagram illustrating an example of a 2-bit map as one piece of meta data according to the second embodiment.

DESCRIPTION OF EMBODIMENTS

First Embodiment

Figure 1:
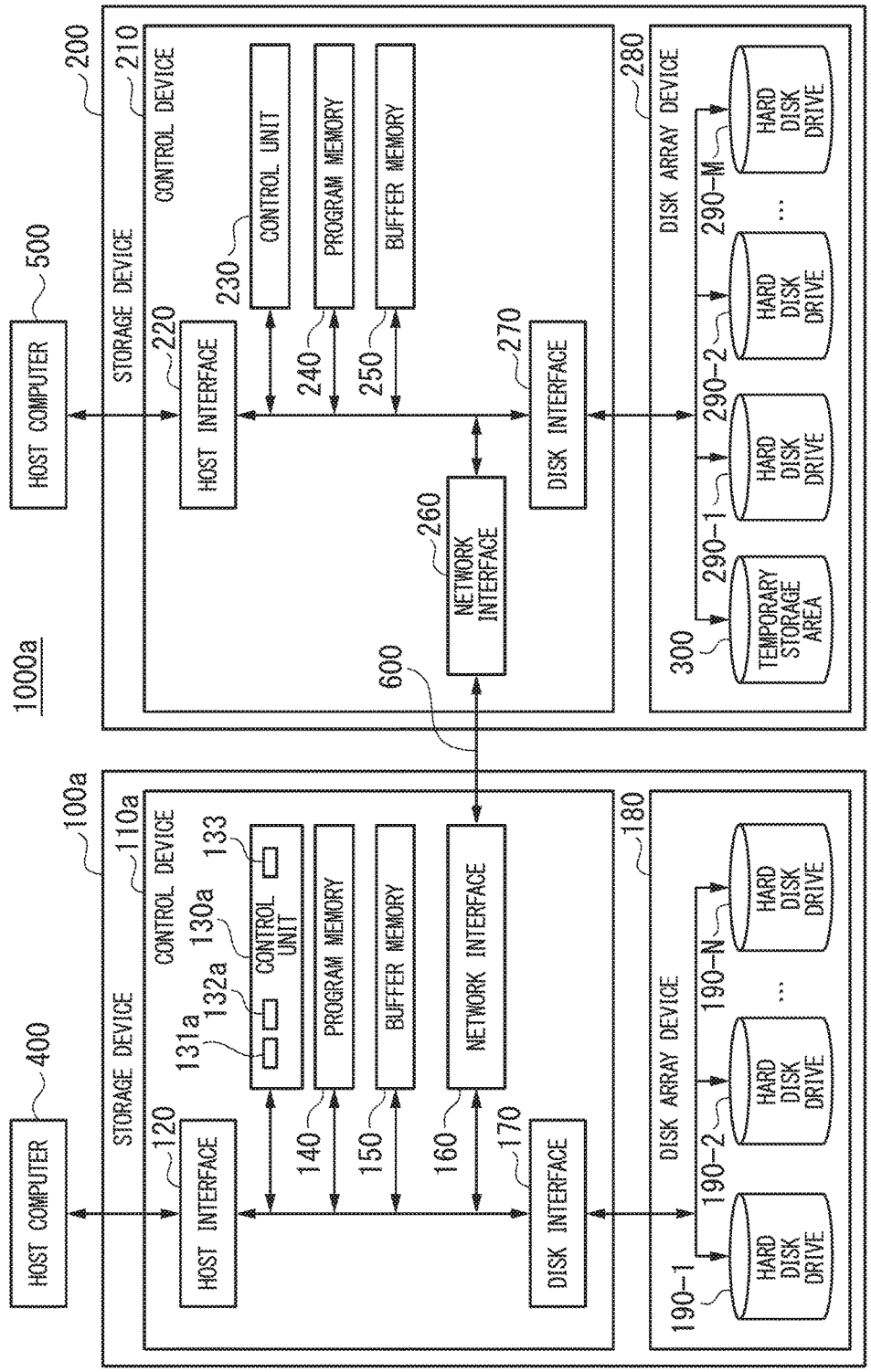
FIG. 1 is a block diagram illustrating a configuration example of a storage system according to a first embodiment.

A storage system according to the first embodiment will be described below referring to the drawings. FIG. 1 is a block diagram illustrating a configuration example of the storage system.

A storage system 1000a includes a host computer 400 and a storage device 100a in a primary site. Furthermore, the storage system 1000a includes a host computer 500 and a storage device 200 in a backup site.

The storage device 100a in the primary site and the storage device 200 in the backup site are connected to each other through a communication line (a network) 600. Data that is stored in the storage device 100a in the primary site is copied (replicated) to the storage device 200 in the backup site by performing replication through the communication line 600.

The backup site may be arranged in a remote location that is at a distance away from the primary site for the purpose of providing protection against a disaster. For example, in the event of a disaster at the primary site, the backup site can perform site switch processing and take over processing by the primary site.

First, a configuration example of the primary site is described.

The host computer 400 outputs an input/output (I/O) command to the storage device 100a and performs data reading or writing. A unit of data that is read from and written to the storage device 100 according to the I/O command from the host computer 400 is a data block of a predetermined size (4 KB to 64 KB). The data block that is the unit of data that is read from and written to the storage device 100a is hereinafter simply referred to as data.

The storage device 100a includes a control device 110a and a disk array device 180. The control device 110a includes a host interface 120, a control unit 130a, a program memory 140, a buffer memory 150, a network interface 160, and a disk interface 170. The units of the storage device 100a are connected to each other through an internal bus.

The disk array device 180 is configured from N hard disk drives 190-1 to 190-N. With the N hard disk drives 190-1 to 190-N, redundant arrays of inexpensive disks (RAID) are set up. For brief description, it is assumed that one RAID is set up in the disk array device 180 and that one logical disk (logical volume) is provided in the one RAID. Of course, multiple RAIDS may be set up in the disk array device 180. Likewise, multiple logical disks may be provided in one RAID. The logical disk is an area that is logically recognized, as a disk drive, by a host computer. The host computer 400 reads and writes data from or to the storage device 100a. If this is further described in detail, the data is read from or written to the logical disk. For brief description, the reading or the writing of the data from or to the logical disk by the host computer 400 is hereafter collectively expressed as reading or writing of the data from or to the storage device 100a by the host computer 400. When what is common to the hard disk drives 190-1 to 190-N is described, the hard disk drives 190-1 to 190-N are hereinafter expressed as the hard disk drive 190 with reference characters 1 to N being omitted. All portions or some portions of the disk array device 180 may be configured from solid state drives (SDDs). The disk interface 170 is connected to the hard disk drive 190.

The host interface 120 is connected to the host computer 400 through a network. A program (firmware) for operating the control unit 130a is stored in the program memory 140.

The buffer memory 150 is a storage unit (work memory) that is used for various operations. Data that is stored in the disk array device 180 is temporarily stored (first retained) in the buffer memory 150. Furthermore, data that is read from the disk array device 180 is temporarily stored in the buffer memory 150. Furthermore, meta data for managing statistical information is stored in the buffer memory 150. At this point, the statistical information, for example, is information indicating an update frequency with which data that is recorded in the disk array device 180 is updated. The meta data according to the first embodiment, which is stored in the buffer memory 150, will be described in detail below referring to FIGS. 2 and 3.

The control unit 130a is configured as a central processing unit (CPU). A frequency detection unit 131a of, a policy management unit 132a of, and a replication performance unit 133 of the control unit 130a are realized by the CPU executing a program that is stored in the program memory 140. Of course, the frequency detection unit 131a, the policy management unit 132a, and the replication performance unit 133 may be built (implemented) in hardware.

The frequency detection unit 131a acquires the update frequency with which the data is updated, by detecting the number of times that the data in the storage device 100a is updated. The frequency detection unit 131a registers the number of times that the update is performed, as the update frequency, in the counter table (refer to FIG. 2).

A counter value of data that is written to address "0" in the storage device 100a is registered, as 2, in the counter table in FIG. 2. This indicates that the data has been updated twice. Furthermore, 128, which is the number of times the data written to address "A" in the storage device 100a is updated, is registered in the counter table. Entries that correspond to all addresses in the storage device 100a are provided in the counter table.

Furthermore, 0, which is the number of times that data written to address "2A" is updated, that is, no update is registered in the counter table. Furthermore, 15, which is the number of times that data written to address "3A" is updated, is registered in the counter table.

The configuration example of the primary site is described referring back to FIG. 1. The policy management unit 132a determines a policy relating to replication to the table (hereinafter referred to as a replication policy) based on the update frequency with which data is updated. More specifically, a replication policy of performing replication each time data is updated is called "transmission at each writing." On the other hand, a policy of performing the replication with a predetermined period (for example, a 24 hour period) is called "transmission with each period." The policy management unit 132a stores a predetermined replication policy for every piece of data, in a replication management table (refer to FIG. 3).

The predetermined period may be a period that is prescribed in advance as a recovery point objective (RPO). The recovery point objective is the time of objective recovery, and means a point in time (timing) at which data backup is acquired or a period with which the data backup is acquired. The period is arbitrarily set based on the frequency with which data is updated, or on what amount of data is restored up to when a failure occurs in a system. At a point in time that is assumed to be the recovery point objective, data of which a counter value in the counter table is a value other than "0" (that is, data of which the counter value is equal to or greater than 1), that is, all pieces of data that are updated are transmitted to the backup site. Accordingly, the primary site and the backup site are synchronized to each other.

FIG. 3 illustrates one example of a replication policy management table (a frequency classification table) that is meta data. In FIG. 3, the replication policy "transmission at each writing" is determined for data that is written to address "0". Furthermore, the replication policy "transmission with each period" is determined for data that is written to address "A". Furthermore, the replication policy "transmission at each writing" is determined for data that is written to address "2A". Furthermore, the replication policy "transmission with each period" is determined for data that is written to address "3A". Entries that correspond to all addresses in the storage device 100a are provided in the replication policy management table.

The configuration example of the primary site is described referring back to FIG. 1. The replication performance unit 133 performs replication of data that is written (updated), based on a replication policy that is set for every piece of data. More specifically, the replication performance unit 133 determines whether or not the replication policy for the data that is written (updated) is the transmission at each writing, based on the replication policy management table.

In addition to the point in time that is assumed to be the recovery point objective, in a case where the policy for the written (updated) data is the transmission at each writing, the replication performance unit 133 transmits the written (updated) data and an address (a primary site address) in the storage device 100a to which the data is written, to the backup site through the network interface 160, along with a replication command. Accordingly, data replication is performed.

On the other hand, at the point in time that is assumed to be the recovery point objective, the replication performance unit 133 transmits all pieces of data of which counter values in the counter table are values that are equal to or greater than 1, and addresses (primary site addresses) in the storage device 100a to which the pieces of data are written, to the backup site through the network interface 160, along with the replication command. Moreover, the point in time that is assumed to be the recovery point objective is a periodic point in time (for example, a 5-minute period or a 24-hour period).

A configuration of the backup site is described.

The host computer 500 is connected to a host interface 220 of a storage device 200. The host computer 500 outputs an I/O command to the storage device 200 and performs reading or writing of data.

The storage device 200 includes a control device 210 and a disk array device 280. The control device 210 includes a host interface 220, a control unit 230, a program memory 240, a buffer memory 250, a network interface 260, and a disk interface 270. The units of the storage device 200 are connected to each other through an internal bus.

A program (firmware) for operating the control unit 230 is stored in the program memory 240.

The buffer memory 250 is a storage unit (work memory) that is used for various operations. Data that is stored in the disk array device 280 is temporarily stored (first retained) in the buffer memory 250. Furthermore, data that is read from the disk array device 280 is temporarily stored in the buffer memory 250. Furthermore, an address table is stored in the buffer memory 250. The address table will be described in detail below referring to FIG. 4.

The control unit 230 is configured as a CPU. The control unit 230 is realized by the CPU executing a program that is stored in the program memory 240. Of course, the control unit 230 may be built (implemented) in hardware.

The disk array device 280 includes M hard disk drives 290 and a temporary storage area 300. With the hard disk drives 290-1 to 290-M, a RAID is set up. For brief description, it is assumed that one RAID is set up in the disk array device 280 and that one logical disk (logical volume) is provided in the one RAID. Of course, multiple RAIDS may be set up in the disk array device 280. Likewise, multiple logical disks may be provided in one RAID. The hard disk drives 290-1 to 290-M are connected to the disk interface 270 of the control device 210. When what is common to the hard disk drives 290-1 to 290-M is described, the hard disk drives 290-1 to 290-M are hereinafter expressed as the hard disk drives 290 with reference characters 1 to M being omitted. Moreover, all portions or some portions of the disk array device 280 may be configured from solid state drives (SSDs). The host computer 500 reads and writes data from or to the storage device 200. If this is further described in detail, the data is read from or written to the logical disk. For brief description, the reading or the writing of the data from or to the logical disk by the host computer 500 is hereafter collectively expressed as reading or writing of the data from or to the storage device 200 by the host computer 500. The disk interface 270 is connected to the hard disk drive 290.

The temporary storage area 300, for example, is configured as one hard disk drive, and is connected to the disk interface 270 of the control device 210. The temporary storage area 300 may be configured as one logical disk that is provided to the RAID which is set up in the disk array device 280.

The control unit 230 temporarily stores data that is received by the network interface 260 through the communication line 600 and that is replicated, in the buffer memory 250, along with an address (a primary site address) of the data in the storage device 100a.

In a case where data that is stored in the buffer memory 250 is data that is transmitted from the storage device 100a based on the policy "transmission at each writing" (refer to FIG. 3), the control unit 230 transmits the data to the temporary storage area 300 for storage.

The data that is temporarily stored in the temporary storage area 300 is finally stored (replicated) by the control unit 230 in (to) the disk array device 280.

The control unit 230 registers the primary site address of the data that is stored in the temporary storage area 300 and an address indicating a storage position in the temporary storage area 300, in the address table that is provided in the buffer memory 250, with the primary site address and the address indicating the storage being associated with each other.

FIG. 4 illustrates one example of the address table. The address table is configured from the primary site address and a temporary storage area address indicating the storage position in the temporary storage area 300.

FIG. 4 illustrates that a primary site address "0" and the temporary storage area address "B1" are associated with each other. Furthermore, a primary site address "3A" and a temporary storage area address "B2" are associated with each other. Furthermore, a primary site address "A" and a temporary storage area address "B3" are associated with each other.

In a case where data that is stored in the buffer memory 250 is data that is transmitted from the storage device 100a based on the policy "transmission with each period" (refer to FIG. 3), the control unit 230 stores the data at the same address as the primary site address in the disk array device 280.

Figure 5:
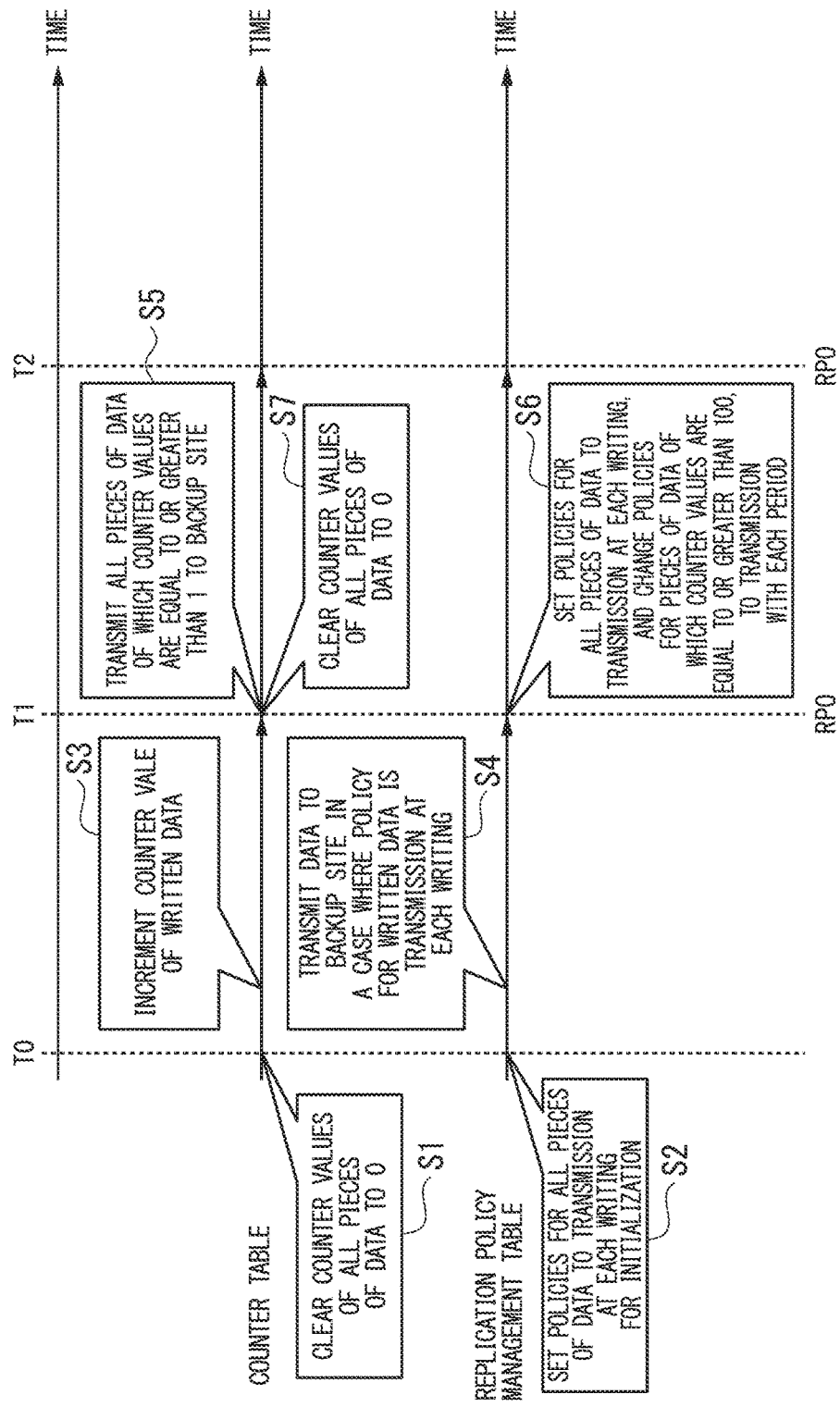
FIG. 5 is a timing chart illustrating an example of replication processing in a primary site according to the first embodiment.

Next, one example of replication processing by the storage system 1000a is described. Before the storage system 1000a starts the replication processing, it is assumed that all pieces of data that are stored in the storage device 100a in the primary sites are copied to the storage device 200 in the backup site and the backup of all the pieces of data is completed. Consequently, the data that is recorded in the primary site and the data that is recorded in the backup site are synchronized to each other. FIG. 5 is a timing chart illustrating one example of the replication processing in the primary site. The horizontal axis indicates time. FIG. 5 illustrates an operational procedure in the counter table (refer to FIG. 2) and the replication policy management table (refer to FIG. 3). A point in time T0 is an initial point in time at which a replication operation is started. A point in time T1 is a point in time that is assumed to be the recovery point objective (RPO) at which the predetermined time has elapsed from the point in time T0. A point in time T2 is also a point in time that is assumed to be the recovery point objective (RPO).

At the point in time T0, the frequency detection unit 131a sets the counter values of the all pieces of data of which addresses are registered in the counter table, to a value 0 for clearing (Step S1).

For initialization, the policy management unit 132a sets a replication policy for each of all pieces of data of which addressees are registered in the replication policy management table, to the "transmission at each writing" (Step S2).

At the point in time T0 or later, in a case where data is written (for update) to the storage device 100a, the frequency detection unit 131a adds a value 1 to the counter value (refer to FIG. 2) in the counter table that corresponds to the written data, for incrementing the counter value (Step S3).

In a case where the replication policy for the written data is the "transmission at each writing," the replication performance unit 133 transmits the written data and the address (the primary site address) to which the data is written, to the backup site through the network interface 160, along with the replication command (Step S4). Thereafter, in a case where data is written to the storage device 100*a* during the elapsed time until the point in time T1 that is the next recovery point objective, the processing operations in Step S3 and Step S4 are performed in the same manner.

At the point in time T1 that is the recovery point objective, the replication performance unit 133 transmits all pieces of data of which the counter values in the counter table are equal to or greater than 1, to the backup site through the network interface 160, along with the replication command for the replication (Step S5).

The policy management unit 132*a* initializes replication policies that are associated with the pieces of data that are stored at all addresses that are registered in the replication policy management table, to the "transmission at each writing." Thereafter, the policy management unit 132*a* changes replication policies that are associated with the pieces of data that are stored at the addresses of which a counter value in the counter table is equal to or greater than 100, to the "transmission with each period" (Step S6).

Additionally, the frequency detection unit 131*a* clears counter values of all pieces of data of which addresses are registered in the counter table, to the value 0 (Step S7). Thereafter, the processing operations in Step S3 to step S7 are repeatedly performed.

Figure 6:
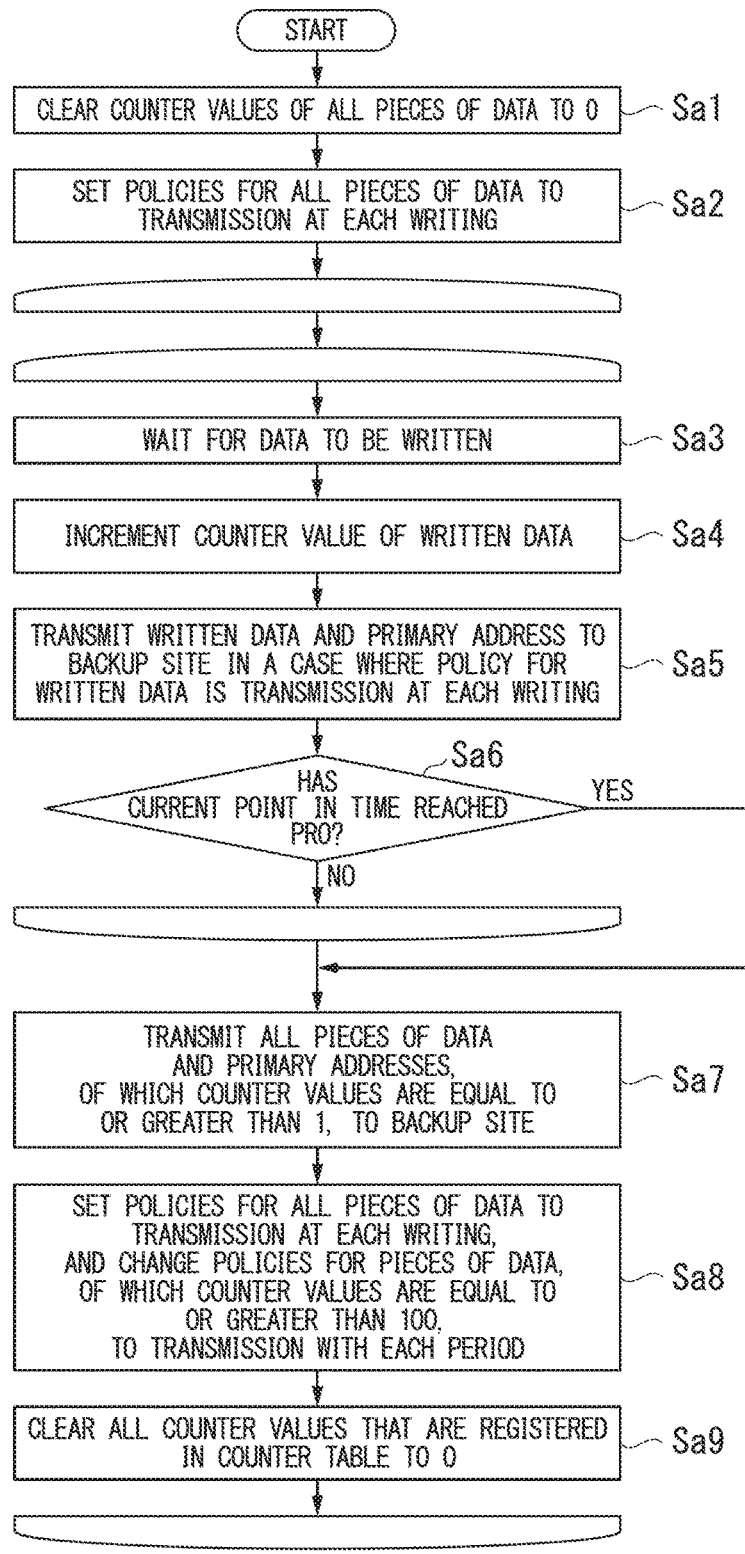
FIG. 6 is a flowchart illustrating an example of the replication processing in the primary site according to the first embodiment.

FIG. 6 is a flowchart illustrating one example of the replication processing in the primary site.

The frequency detection unit 131*a* clears the counter values of the pieces of data of which addresses are registered in the counter table (refer to FIG. 2), to the value 0 (Step Sa1).

At this point, subsequent operations are described on the assumption that a point in time at which the processing operation in Step Sa1 is performed is the point in time T0 that is illustrated in FIG. 5.

For initialization, the policy management unit 132*a* sets replication policies for the all pieces of data of which addresses are registered in the replication policy management table (refer to FIG. 3), to the "transmission at each writing" (Step Sa2).

The frequency detection unit 131*a* waits for the writing of data to the disk array device 180, that is, the update of data (Step Sa3).

The frequency detection unit 131*a* adds the value 1 to the counter value (refer to FIG. 2) in the counter table that corresponds to the written (updated) data, for incrementing the counter value (Step Sa4).

The replication performance unit 133 determines whether or not the replication policy for the written (updated) data is the "transmission at each writing," based on the replication policy management table. In the case where the replication policy for the written data is the "transmission at each writing," the replication performance unit 133 transmits the written data and the primary site address of the written data, to the backup site through the network interface 160, along with the replication command (Step Sa5).

The replication performance unit 133 determines whether or not a current point in time has reached a point in time of the replication point objective (RPO) at which the predetermined time has elapsed from the point in time T0 (Step Sa6). In a case where the current point in time has reached the point in time of the recovery point objective (RPO) (Yes in Step Sa6), the replication performance unit 133 causes the processing to proceed to Step Sa7.

On the other hand, in a case where the current point in time has not reached the point in time of the recovery point objective (RPO) (No in Step Sa6), the replication performance unit 133 returns the processing to Step Sa3 (Step Sa6).

The replication performance unit 133 transmits pieces of data which are written to all addresses of which counter values (refer to FIG. 2) in the counter table are equal to or greater than 1, and primary site addresses of the pieces of data, to the backup site through the network interface 160, along with the replication command (Step Sa7).

The policy management unit 132*a* initializes the replication policies for the pieces of data that are written to all addresses that are registered in the replication policy management table (refer to FIG. 3), to the "transmission at each writing." Additionally, the policy management unit 132*a* changes the replication policies for the pieces of data which are written to the addresses of which counter values (refer to FIG. 2) in the counter table are equal to or greater than 100, to the "transmission with each period." At this point, the counter value of target data for which the replication policy is changed to the "transmission with each period" is set to 100 or greater. However, a limitation to data of which the counter value is equal to or greater than 100 is not imposed in this manner. With a system configuration or a system operation method, a system manager may arbitrarily determine a reference value. If the counter value is equal to or greater than the reference value, the replication policy is changed to the "transmission with each period." To be more precise, it is important to change the replication policy for data that is determined as having a high update frequency to the transmission with each period" (Step Sa8).

The frequency detection unit 131*a* clears the counter value of the pieces of data that are written to all addresses that are registered in the counter table, to the value 0 (Step Sa9). After the processing operation in Step Sa9 is performed, the processing returns to Step Sa3.

Figure 7:
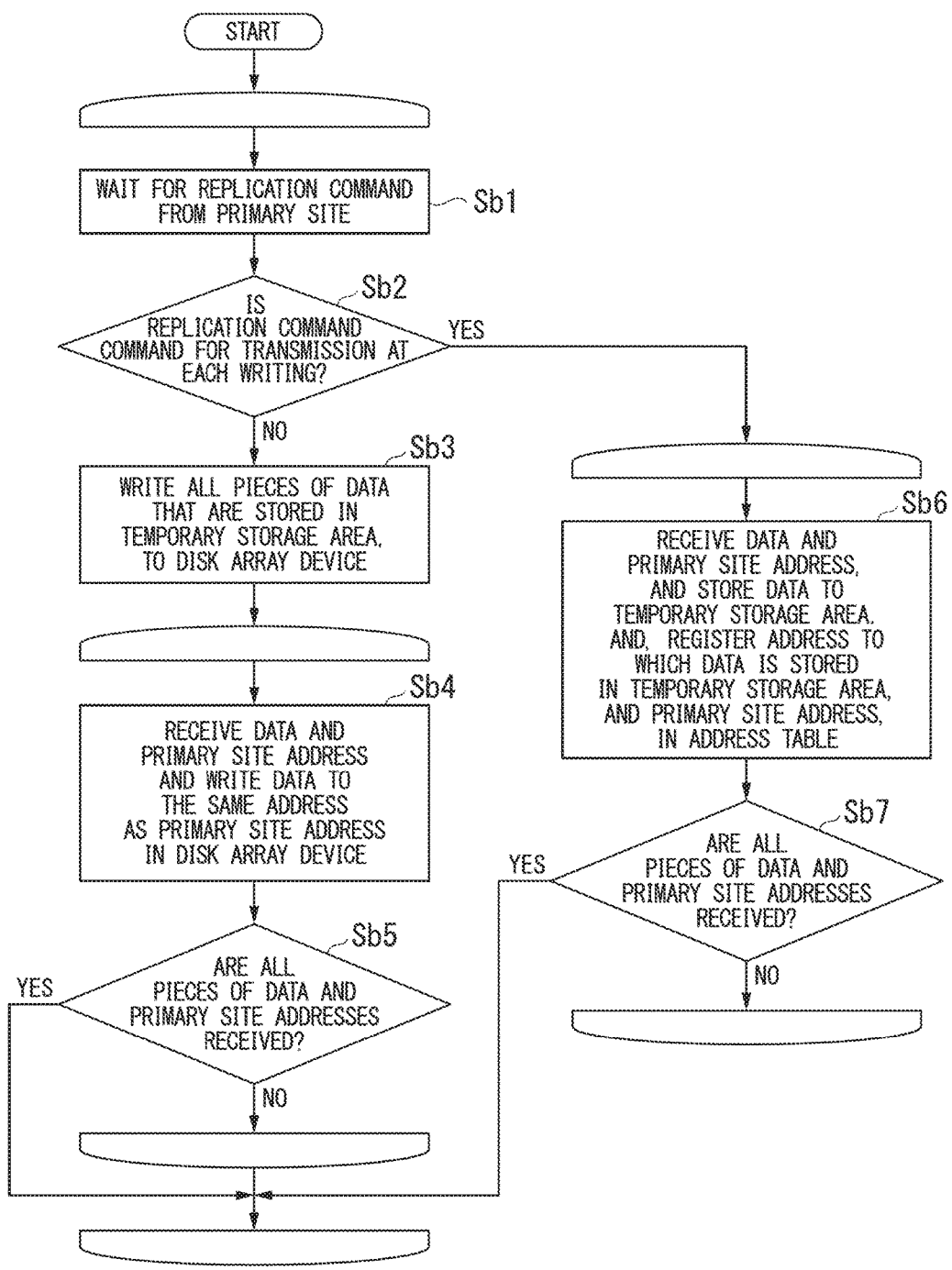
FIG. 7 is a flowchart illustrating an example of data reception processing in the backup site according to the first embodiment.

FIG. 7 is a flowchart illustrating one example of the replication processing in the backup site.

The control unit 230 waits for the replication command that is transmitted from the primary site (Step Sb1).

The control unit 230 determines whether or not the replication command that is transmitted from the primary site is for replicating data for which the replication policy is the transmission at each writing (refer to FIG. 3) (Step Sb2).

In a case where the replication command is a replication command for the data for which the replication policy is the transmission at each writing (Yes in Step Sb2), the control unit 230 proceeds the processing to Step Sb6. On the other hand, in a case where the replication command is not a replication command for the data for which the replication policy is the transmission at each writing, to say, the replication command being a replication command for the data for which the replication policy is the transmission at each period, (No in Step Sb2), the control unit 230 causes the processing to proceed to Step Sb3.

In the processing operation in Step Sb3, the control unit 230 reads all pieces of data that are temporarily stored in the temporary storage area 300, based on a temporary storage area address that is registered in the address table (refer to FIG. 4). The control unit 230 writes data that is read from the temporary storage area 300, to the disk array device 280. At this point, the address in the disk array device 280, to which the control unit 230 writes the data, is the same address as the primary site address that is associated with the temporary storage area address from which the data is read in the address table. The replication is performed by writing the data to the disk array device 280 (Step Sb3).

The control unit 230 receives data that accompanies the replication command (the replication command that is determined in Step Sb2) that is transmitted from the primary site, and the primary site address of the data. The control unit 230 writes the received data to the same address in the disk array device 280 as the received primary site address. The replication of the received data is performed by writing the data (Step Sb4).

The control unit 230 determines whether or not all pieces of data that accompany the replication command and primary site addresses of the pieces of data are received. In a case where all the pieces of data and the primary site addresses are received (Yes in Step Sb5), the control unit 230 causes the processing to return to Step Sb1. On the other hand, in a case where there remains data and a primary site address of the data that have yet to be received (No in Step Sb5), the control unit 230 causes the processing to return to Step Sb4 (Step Sb5).

On the other hand, in the processing operation in Step Sb6, the control unit 230 receives data that accompanies the replication command which is transmitted from the primary site, and the primary site address of the data. The control unit 230 stores the received data in the temporary storage area 300. The control unit 230 registers an address (a temporary storage area address) in the temporary storage area 300, in which the received data is stored, and the received primary site address, in the address table (refer to FIG. 4), with the two addresses being associated with each other (Step Sb6).

The control unit 230 determines whether or not all pieces of data that accompany the replication command and primary site addresses of the pieces of data are received. In a case where all the pieces of data and the primary site addresses are received (Yes in Step Sb7), the control unit 230 causes the processing to return to Step Sb1. On the other hand, in a case where there remains data and a primary site address of the data that have yet to be received (No in Step Sb7), the control unit 230 causes the processing to return to the processing operation in Step Sb6 (Step Sb7).

Figure 8:
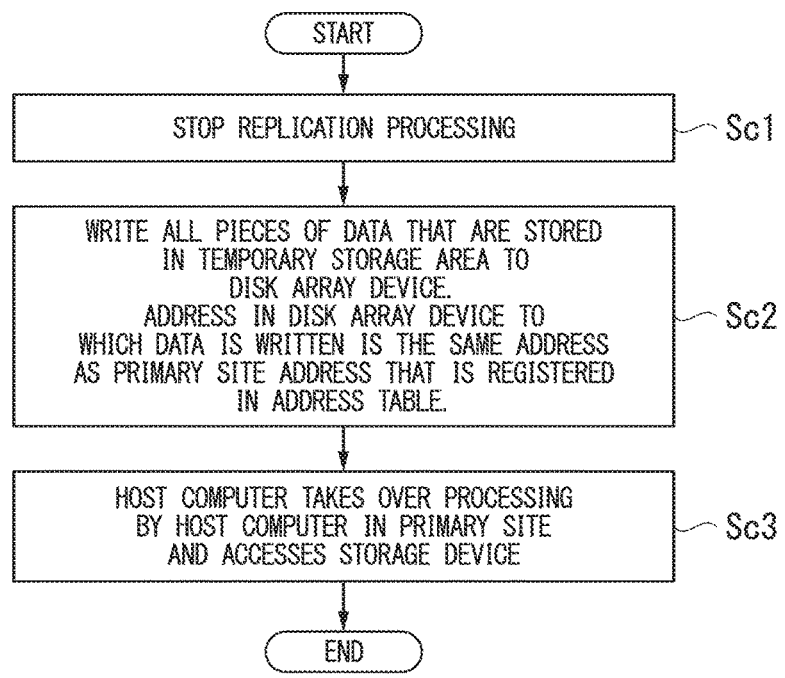
FIG. 8 is a flowchart illustrating an example of site switch processing in the backup site according to the first embodiment.

FIG. 8 is a flowchart illustrating an example of the site switch processing in the backup site. For example, in the event of a disaster, the backup site can perform site switch processing and take over processing by the primary site.

The storage device 200 (refer to FIG. 1) in the backup site stops the replication processing in order to perform the site switch processing (Step Sc1).

The control unit 230 reads all pieces of data that are temporarily stored in the temporary storage area 300, based on the temporary storage area address that is registered in the address table (refer to FIG. 4).

The control unit 230 writes data that is read from the temporary storage area 300, to the disk array device 280. At this point, the address in the disk array device 280 to which the control unit 230 writes data is the same address as the primary site address that is associated with the temporary storage area address from which the data is read in the address table. The replication is performed by writing the data to the disk array device 280 (Step Sc2).

The host computer 500 takes over the processing by the host computer 400 in the primary site and accesses the storage device 200 (Step Sc3).

In this manner, according to the present embodiment, a replication policy for data is determined based on the update frequency, and the replication of the data is performed based on the replication policy. The following two replication policies are set that are different from each other in terms of a period of time during which the data is replicated. One policy is the "transmission at each writing" for performing the replication each time data is updated. The other policy is the "transmission with each period" for replicating data with a predetermined period. With this setting of the replication policy, the transmission of a large amount of data from the primary site to the backup site for the replication is not performed at one time. Consequently, congestion can be avoided that occurs on a communication path between the primary site and the backup site.

Second Embodiment

A storage system according to a second embodiment will be described in detail below referring to the drawings. The second embodiment is different from the first embodiment in terms of meta data for performing data replication. Only a difference between the second embodiment and the first embodiment will be described below.

Figure 9:
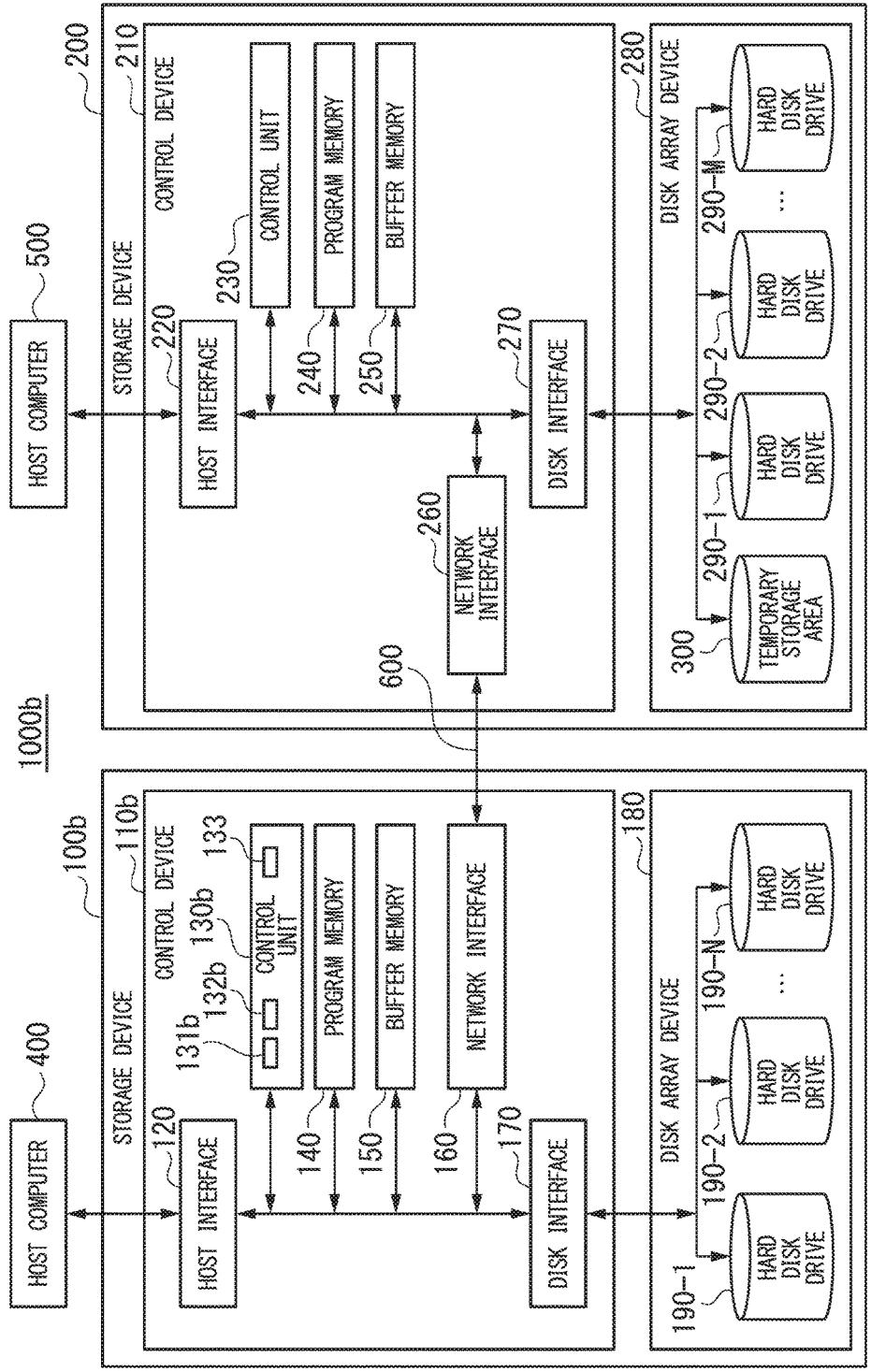
FIG. 9 is a block diagram illustrating a configuration example of a storage system according to a second embodiment.

FIG. 9 is a block diagram illustrating a configuration example of the storage system. A storage system 1000b includes the host computer 400 and a storage device 100b in the primary site. Furthermore, a data replication system 1000b includes the host computer 500 and the storage device 200 in the backup site.

The storage device 100b in the primary site and the storage device 200 in the backup site are connected to each other through the communication line (the network) 600. Data that is stored in the storage device 100b in the primary site is copied (replicated) to the storage device 200 in the backup site by performing replication through the communication line 600.

Next, a configuration example of the primary site is described.

The storage device 100b includes a control device 110b and the disk array device 180. The control device 110b includes the host interface 120, a control unit 130b, the program memory 140, the buffer memory 150, the network interface 160, and the disk interface 170. The units of the storage device 100b are connected to each other through an internal bus.

The host interface 120 is connected to the host computer 400 through a network.

A program (firmware) for operating the control unit 130b is stored in the program memory 140.

The buffer memory 150 is a storage unit (work memory) that is used for various operations. Data that is stored in the disk array device 180 is temporarily stored (first retained) in the buffer memory 150. Furthermore, data that is read from a data block of the disk array device 180 is temporarily stored in the buffer memory 150. Furthermore, meta data for managing statistical information is stored in the buffer memory 150. At this point, the statistical information, for example, is information indicating the update frequency with which data that is recorded in the disk array device 180 is updated. The meta data according to the second embodiment will be described in detail below referring to FIG. 10.

The control unit 130b is configured as a central processing unit (CPU). A frequency detection unit 131b of, a policy management unit 132b of, and the replication performance unit 133 of the control unit 130b are realized by the CPU executing a program that is stored in the program memory 140. Of course, the frequency detection unit 131a, the policy management unit 132b, and the replication performance unit 133 may be built (implemented) in hardware.

The frequency detection unit 131b detects a time span during which data is updated in the storage device 100b and registers the detected time span in a two-bit map.

Figure 10:
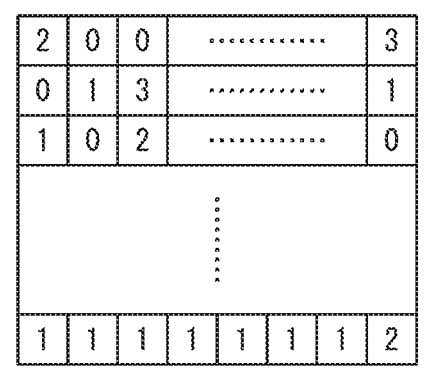

FIG. 10 illustrates one example of a two-bit map. The time spans for updating of all pieces of data that are written to the storage device 100b are registered in the two-bit map, with the time spans being associated with addresses to which the pieces of data are written. The time spans for the updating, which are registered in the two-bit map, are expressed in two bits. More specifically, the time spans for the updating are represented as follows.

00b: non-update

01b: first time span (which indicates that data is updated during a time span from 00 to 19 minutes on the hour)

10b: second time span (which indicates that data is updated during a time span from 20 to 39 minutes on the hour)

11b: third time span (which indicates that data is updated during a time span from 40 to 59 minutes on the hour)

A letter b in 00b to 11b described above indicates a binary-number representation. A two-bit representation "00b" in the two bit map hereinafter described as a value 0. In the same manner, a two-bit representation "01 b" is described as a value 1. A two-bit representation "10b" is described as a value 2. A two-bit representation "11b" is described as a value 3.

In the two-bit map that is illustrated in FIG. 10, a time span for updating data that is written to address 0 in a state of being associated with address 0 is recorded, as a value 2, in the uppermost leftmost box. To be more precise, data that is written to address 0 is registered as being updated during the second time span. In the two-bit map, a time span for updating data, that is written to address A, is recorded as a value 3, in the uppermost rightmost box, in a state of being associated with address A. To be more precise, data that is written to address A is registered as being updated during the third time span. In the two-bit map, a time span for updating data that is written to address 3A in a state of being associated with address 3A is recorded, as a value 0, in the third-line rightmost box. To be more precise, data that is written to address 3A is registered as not being updated. In the two-bit map, because time spans for updating of all pieces of data that are written to the storage device 100b are all registered as two-bit representations, the capacity of the two-bit map can be compactly realized as a small capacity without becoming a large capacity. In the two-bit map, entries that correspond to all addresses in the storage device 100b are provided.

Moreover, instead of being expressed with four values (00b, 01b, 10b, and 11b) as meta data, the time span for updating data may be expressed with three values (for example, 0: non-update, 1: a threshold time has elapsed from a point in time at which data was updated, and 2: a threshold time has not elapsed from a point in time at which data was updated). In this case, the meta data may be stored in a three-valued logic storage unit.

Next, an example of a procedure for operation by the storage system 1000b is described.

Figure 11:
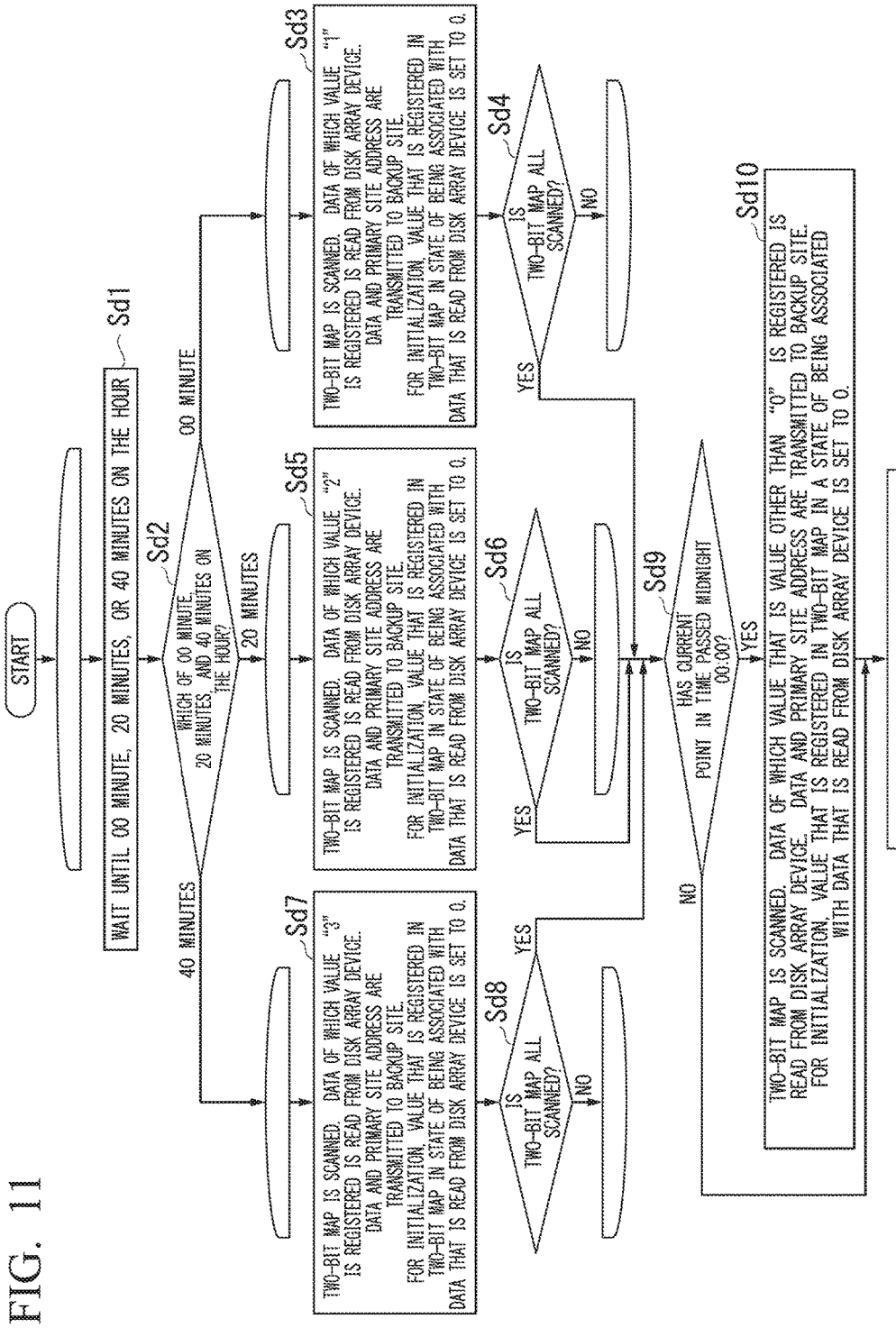
FIG. 11 is a flowchart illustrating an example of the replication processing in the primary site according to the second embodiment.

FIG. 11 is a flowchart illustrating the replication processing in the primary site. All processing operations in the flowchart that is illustrated in FIG. 11 are performed repeatedly. In FIG. 11, as one example, a description is provided on the assumption that, as one example, midnight 00:00 every day is predetermined as the recovery point objective (RPO).

The control unit 130b waits until the current point in time is any one of 00 minute, 20 minutes, and 40 minutes on the hour, referring to time information that includes date information which a system not illustrated retains. In a case where the current point in time is any one of 00 minute, 20 minutes, and 40 minutes, the control unit 130b causes the processing to proceed to Step Sd2 (Step Sd1).

The control unit 130b determines which of 00 minute, 20 minutes, or 40 minutes on the hour the current point in time is. In a case where the current point in time is 00 minute on the hour (00 minute in Step Sd2), the control unit 130b causes the processing to proceed to Step Sd3. Furthermore, in a case where the current point in time is 20 minutes on the hour (20 minutes on the hour in Step Sd2), the control unit 130b causes the processing to proceed to Step Sd5. Furthermore, in a case where the current point in time is 40 minutes on the hour (40 minutes on the hour in Step Sd2), the control unit 130b causes the processing to proceed to Step Sd7 (Step Sd2).

In a case where the processing is caused to proceed to Step Sd3, the replication performance unit 133 scans the two-bit map starting from the head thereof, searches for data that was updated during the 20 minutes 40 or more minutes earlier than the current point in time 00 minute, and reads the data, which is found as a result of the search, from the disk array device 180. To be more precise, referring to the two-bit map, the replication performance unit 133 reads data that is written to an address which is registered in a state where the value 1 (01b in terms of a two-bit representation) is associated with the address, from the disk array device 180. The replication performance unit 133 transmits the replication command that is accompanied by the data that is read, and the address (the primary site address) in which the data that is read is recorded, to the backup site. By transmitting the replication command to the backup site, the data that was updated during the 20 minutes 40 or more minutes earlier than the current point in time 00 minute is regarded as having a low update frequency, and is backup-processed. The replication command that is transmitted to the backup site is the replication command for short-period processing. Thereafter, in the two-bit map, the replication performance unit 133 initializes a value that is registered in a state of being associated with the data that is read, to be set to 0 (Step Sd3).

The replication performance unit 133 determines whether or not the two-bit map is all scanned up to and including the end thereof (Step Sd4). In a case where the two-bit map is all scanned up to and including the end thereof (Yes in Step Sd4), the processing is caused to proceed to processing operation in Step Sd9. In a case where the two-bit map is not scanned up to and including the end thereof (No in Step Sd4), the processing returns to Step Sd3.

In a case where the processing is caused to proceed to Step Sd5, the replication performance unit 133 searches for data that was updated during the 20 minutes 40 or more minutes earlier than a current point in time that is 20 minutes, referring to the two-bit map, and reads the data, which is found as a result of the search, from the disk array device 180. To be more precise, referring to the two-bit map, the replication performance unit 133 reads data that is written to an address which is registered in a state where the value 2 (10b in terms of a two-bit representation) is associated with the address, from the disk array device 180. The replication performance unit 133 transmits the replication command that is accompanied by the data that is read, and the address (the primary site address) in which the data that is read is recorded, to the backup site. By transmitting the replication command to the backup site, the data that was updated during the 20 minutes 40 or more minutes earlier than the current point in time that is 20 minutes is regarded as having a low update frequency, and is backup-processed. The replication command that is transmitted to the backup site is the replication command for short-period processing. Thereafter, in the two-bit map, for initialization, the replication performance unit 133 initializes a value that is registered in a state of being associated with the data that is read, to be set to 0 (Step Sd5).

The replication performance unit 133 determines whether or not the two-bit map is all scanned up to and including the end thereof (Step Sd6). In the case where the two-bit map is all scanned up to and the end thereof (Yes in Step Sd6), the processing is caused to proceed to processing operation in Step Sd9. In the case where the two-bit map is not scanned up to and including the end thereof (No in Step Sd6), the processing returns to Step Sd5.

In a case where the processing is caused to proceed to Step Sd7, the replication performance unit 133 searches for data that was updated during the 20 minutes 40 or more minutes earlier than a current point in time that is 40 minutes, referring to the two-bit map, and reads the data, which is found as a result of the search, from the disk array device 180. To be more precise, referring to the two-bit map, the replication performance unit 133 reads data that is written to an address which is registered in a state where the value 3 (11b in terms of a two-bit representation) is associated with the address, from the disk array device 180. The replication performance unit 133 transmits the replication command that is accompanied by the data that is read, and the address (the primary site address) in which the data that is read is recorded, to the backup site. By transmitting the replication command to the backup site, the data that was updated during the 20 minutes 40 or more minutes earlier than the current point in time that is 40 minutes is regarded as having a low update frequency, and is backup-processed. The replication command that is transmitted to the backup site is the replication command for short-period processing. Thereafter, in the two-bit map, for initialization, the replication performance unit 133 initializes a value that is registered in a state of being associated with the data that is read, to be set to 0 (Step Sd7).

The replication performance unit 133 determines whether or not the two-bit map is all scanned up to and including the end thereof (Step Sd8). In the case where the two-bit map is all scanned up to and the end thereof (Yes in Step Sd8), the processing is caused to proceed to processing operation in Step Sd9. In the case where the two-bit map is not scanned up to and including the end thereof (No in Step Sd8), the processing returns to Step Sd7.

The control unit 130*b* determines whether or not the current point in time has passed midnight 00:00 that is predetermined as the recovery point objective (PRO), referring to the time information that includes the date information that the system not illustrated retains. The control unit 130*b* records the date information indicating the date on which the current point in time has passed midnight (i.e., 00:00) last time, and thus can determine that the current point in time has newly passed midnight (i.e., 00:00), referring to the time information (Step Sd9).

In a case where the current point in time has passed midnight 00:00 (Yes in Step Sd9), the policy management unit 132*b* causes the processing to proceed to Step Sd10. The fact that the current point in time has passed the midnight 00:00 means that the current point in time is the time for the recovery point objective (RPO). On the other hand, in a case where the current time has not passed the midnight 00:00 (No in Step Sd9), the policy management unit 132*b* causes the processing to return to Step Sd1.

Referring to the two-bit map, the replication performance unit 133 reads the pieces of data that are written to addresses which are registered in a state where a value other than the value 0 (00b in terms of a two-bit representation) is associated with the address, from the disk array device 180. To be more precise, the replication performance unit 133 reads the pieces of data that are written to addresses which are registered in a state where, in the two-bit map, the value 1 (01b in terms of a two-bit representation), the value 2 (10*b* in terms of two-bit representation), or the value 3 (11b in terms of two-bit representation) is associated with the address), from the disk array device 180. The replication performance unit 133 transmits the replication command that is accompanied by the data that is read, and the addresses (the primary site addresses) in which the data that is read is recorded, to the backup site. By transmitting the replication command described above to the backup site, data that is not backed up in each processing operation in Steps Sd3, Sd5, and Sd7 and that has a high update frequency is backup-processed. The replication command that is transmitted to the backup site is the replication command for long-period processing. Thereafter, in the two-bit map, for initialization, the replication performance unit 133 initializes a value that is registered in a state of being associated with the data that is read, to be set to 0 (Step Sd10).

Figure 12:
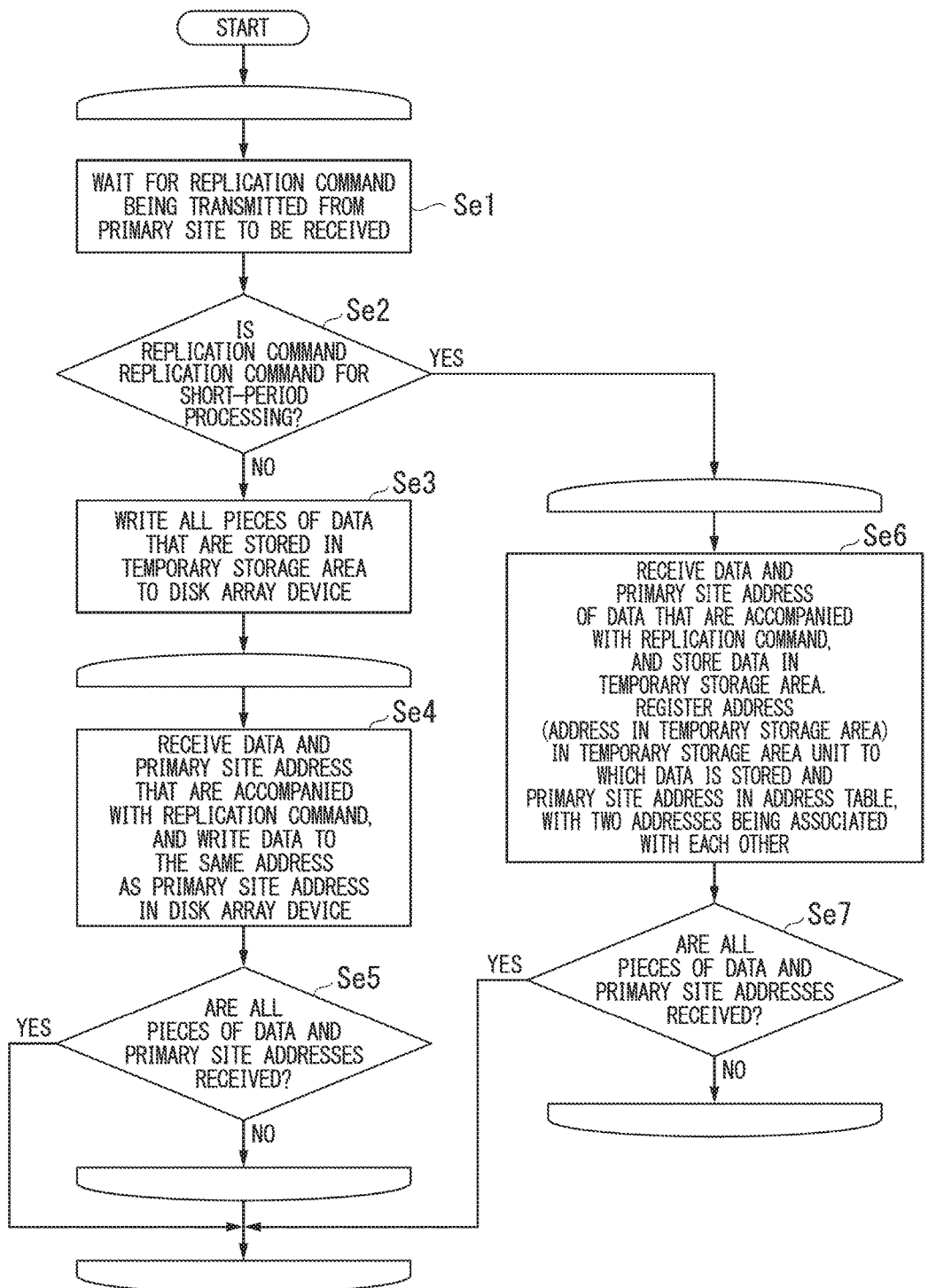
FIG. 12 is a flowchart illustrating an example of data reception processing in the backup site according to the second embodiment.

FIG. 12 is a flowchart illustrating the replication processing in the backup site. The control unit 230 waits to receive the replication command that is transmitted from the primary site (Step Se1).

The control unit 230 determines whether or not the replication command that is transmitted from the primary site is the replication command for the short-period processing. To be more precise, in a case where the current point in time is any one of 00 minute, 20 minutes, and 40 minutes, the control unit 230 determines that the replication command that is transmitted from the primary site is the replication command for the short-period processing. However, in a case where the current point in time is midnight 00:00, the control unit 230 determines that the replication command that is transmitted from the primary site is the replication command for the long-period processing.

In a case where the replication command that is transmitted from the primary site is the replication command for the short-period processing (Yes in Step Se2), the control unit 230 causes the processing to proceed to Step Se6. On the other hand, in a case where the replication command that is transmitted from the primary site is not the replication command for the short-period processing (No in Step Se2), the control unit 230 causes the processing to proceed to Step Se3. In this case, the control unit 230 can determine that the received replication command is the long-period processing (Step Se2).

In Step Se6, the control unit 230 receives data and a primary site address of the data which are accompanied with the replication command transmitted from the primary site, and a primary site address of the data. The control unit 230 stores the received data in the temporary storage area 300. The control unit 230 registers an address (a temporary storage area address) in the temporary storage area 300, at which the received data is stored, and the received primary site address, in the address table (refer to FIG. 4), with the two addresses being associated with each other (Step Sb6).

The control unit 230 determines whether or not all pieces of data and primary site addresses of the pieces of the data, that are accompanied with the replication command, are received. In a case where all the pieces of data and the primary site addresses are received (Yes in Step Se7), the control unit 230 causes the processing to return to Step Se1. On the other hand, in a case where there remains data and a primary site address of the data that have not been received (No in Step Se7), the control unit 230 causes the processing to return to the processing operation in Step Se6 (Step Se7).

On the other hand, in the processing operation in Step Se3, the control unit 230 reads all pieces of data that are temporarily stored in the temporary storage area 300, based on temporary storage area addresses that are registered in the address table (refer to FIG. 4). The control unit 230 writes data that is read from the temporary storage area 300, to the disk array device 280. At this point, the address in the disk array device 280, to which the control unit 230 writes the data, is the same address as the primary site address that is associated with the temporary storage area address from which the data is read in the address table. The replication is performed by writing the data to the disk array device 280 (Step Se3).

The control unit 230 receives data the primary site address of the data that are accompanied with the replication command for the long-period processing (a case where it is determined that the replication command that a determination as No is made in Step Se2) transmitted from the primary site. The control unit 230 writes the received data to the same address in the disk array device 280 as the received primary site address. The replication of the received data is performed by writing the data (Step Se4).

The control unit 230 determines whether or not all pieces of data and primary site addresses of the pieces of data, that are accompanied with the replication command, are received. In the case where all the pieces of data and the primary site addresses are received (Yes in Step Se5), the control unit 230 causes the processing to return to Step Se1. On the other hand, in the case where there remains data and a primary site address of the data that have yet to be received (No in Step Se5), the control unit 230 causes the processing to return to Step Se4 (Step Se5).

In this manner, according to the present embodiment, a time span during which the data is updated is registered in the two-bit map, and, based on the time span of the data update, that is registered in the two-bit map, two types of data replication are realized. In one type, data that was updated during the 20 minutes 40 or more minutes earlier than the current point in time is replicated at 00 minute, 20 minutes, and 40 minutes on the hour. This is the replication for the short-period processing. In the other type, all pieces of data that are updated are replicated in a predetermined point in time, for example, in a point of time of the recovery point objective (RPO). This is the replication for the long-period processing.

The replication for the short-period processing and the replication for the long-period processing are provided in this manner, and thus the transmission of a large amount of data from the primary site to the backup site for the replication is not performed at one time. Consequently, the congestion can be avoided that occurs on a communication path between the primary site and the backup site.

Additionally, according to the present embodiment, meta data for managing the replication is realized in the two-bit map. For this reason, a meta data capacity can be realized as a small memory capacity without being bloated.

Some embodiments according to the present invention are described above, but these embodiments are provided as only examples and therefore are not intended to limit the scope of the invention. These embodiments can be implemented in various other forms, and various omissions, substitutions and modifications can be performed within a scope that does not depart from the gist of the invention. The embodiments and the modifications thereto are included in the scope of the invention described in claims and of an equivalent of the invention, in the same manner that the embodiments and the modifications are included in the scope and gist of the invention.

The invention claimed is:

1. A storage system, comprising:
   a first storage device in which data is recorded and which is provided in a primary site; and
   a second storage device in which data is recorded and which is provided in a backup site,
   wherein the first storage device includes:
     a recording unit in which the data is stored, and
     a control unit that transmits the data that is recorded in the recording unit to the backup site in order to perform replication, and
   wherein the control unit includes:
     an update time span detection unit that detects during which of multiple time spans, which result from dividing one hour into first given time intervals, data is updated,
     an update time span information storage unit in which update time span information indicating the update time span that is detected by the update time span detection unit is stored in a state of being associated with every piece of data that is stored in the storage unit, and
     a replication performance unit that transmits the data that is stored in the storage unit to the backup site in order to perform the replication, based on the update time span information that is stored in the update time span information storage unit, referring to the update time span information storage unit,
   wherein, at every point in time that results from dividing the one hour into the first given time intervals, the replication performance unit transmits the data that is updated during a time span from a point in time as a starting point that is a given number of the time intervals earlier than the point in time to a point in time that is the first given time interval earlier than the point in time, as data that has a low update frequency, to the backup site in order to perform the replication,
   wherein, at every point in time at which a second given time elapses, the replication performance unit transmits all pieces of data that are set to be updated, according to update time span information, to the backup site, as data that has a high update frequency, in order to perform the replication, and
   wherein, the update time span detection unit sets the update time span information, which is stored in the update time span information storage unit in a state of being associated with the data that is transmitted by the replication performance unit to the backup site, to 'not being updated yet'.

* * * * *